United States Patent [19]

Jenkins et al.

[11] Patent Number: 5,039,195
[45] Date of Patent: Aug. 13, 1991

[54] COMPOSITE CABLE INCLUDING PORTIONS HAVING CONTROLLED FLEXURAL RIGIDITIES

[75] Inventors: Artis C. Jenkins, Lithonia; Parry A. Moss, Stone Mountain; Carla G. Wilson, Lithonia, all of Ga.

[73] Assignee: AT&T Bell Laboratories, Murray Hill, N.J.

[21] Appl. No.: 529,991

[22] Filed: May 29, 1990

[51] Int. Cl.⁵ .............................................. G02B 6/44
[52] U.S. Cl. .................... 385/101; 174/70 R; 385/100
[58] Field of Search .............. 350/96.23; 174/70 R, 174/70 A

[56] References Cited

U.S. PATENT DOCUMENTS

| | | | |
|---|---|---|---|
| 3,347,649 | 10/1967 | Singer | 350/96.23 X |
| 4,110,001 | 8/1978 | Olszewski et al. | 350/96.23 |
| 4,199,225 | 4/1980 | Slaughter et al. | 350/96.23 |
| 4,449,012 | 5/1984 | Voser | 174/70 A |
| 4,679,897 | 7/1987 | Driskel | 350/96.23 |
| 4,690,499 | 9/1987 | Taylor et al. | 350/96.23 |
| 4,723,831 | 2/1988 | Johnson et al. | 350/96.23 |
| 4,836,639 | 6/1989 | Shamoto et al. | 350/96.23 |
| 4,846,566 | 7/1989 | Barnett et al. | 350/96.23 |
| 4,852,965 | 8/1989 | Mullin et al. | 350/96.23 |
| 4,900,126 | 2/1990 | Jackson et al. | 350/96.23 |

Primary Examiner—John D. Lee
Attorney, Agent, or Firm—E. W. Somers

[57] ABSTRACT

A hybrid optical fiber, copper conductor transmission media cable (20) which is suitable for use in local area network application includes a core (22) comprising two arrays (25,40) of longitudinally extending portions. One array (25) includes optical fibers disposed between two strength members (27—27) whereas the other array comprises metallic conductors (42—42). Each array includes a matrix material (30,45) in which the longitudinally extending portions are enclosed with adjacent portions being connected by a web (32,47). The two arrays are enclosed by a jacket (50) which has an oval shaped configuration. The configuration of component portions of the cable as well as the materials thereof are determined to cause the neutral axis of bending to be in a desired location which minimizes losses in the transmission media.

21 Claims, 1 Drawing Sheet

COMPOSITE CABLE INCLUDING PORTIONS HAVING CONTROLLED FLEXURAL RIGIDITIES

TECHNICAL FIELD

This invention relates to a composite cable. More particularly, the invention relates to a composite cable such as a hybrid cable which includes optical as well as metallic transmission media, which is easy to manufacture and which is easy to access and to connectorize in a factory environment or in the field.

BACKGROUND OF THE INVENTION

Optical fiber has found widespread application in longhaul transmission such as, for example, between cities. It is readily apparent that optical fiber can be used not only in longhaul applications but also in local area networks, service or drop applications, and in indoor cable. As a result, end to end optical communication is fast becoming a reality.

Optical fiber cables designed for longhaul applications typically are not well suited for use in the local distribution network. For instance, such cables typically are designed to have a medium to relatively high fiber count, are frequently relatively rigid and have a relatively large bending radius, and tend to be relatively costly to manufacture. On the other hand, cable for use in local distribution networks should have a low fiber count, e.g., less than about ten fibers, should be flexible, should be usable in a variety of environments, should be installable by existing procedures and equipment and should be easy to manufacture and low in cost.

Notwithstanding the rapidly escalating use of optical fiber, there remains a need for metallic conductors such as copper conductors. Metallic conductors may be sought after to provide power or may be used for other low voltage signalling purposes. Furthermore, there may be a need for both optical fiber and metallic conductors at the same end use point. One such application may be at office workstations in a computerized facility.

Such a need translates into a need of a hybrid cable which is intended to refer to a cable which includes both optical fiber and metallic transmission media. The sought after cable should have relatively high tensile axial loading capability, have sufficient flexural stiffness to minimize bend losses, and inasmuch as it most likely will be used on customers' premises, it should be suitably flame retardant. Also, the sought after cable should be relatively easy to manufacture and to connectorize despite the presence of different kinds of transmission media.

Hybrid cables are known to the prior art. For example, described in F. J. Mullin - W. S. Reed U.S. Pat. No. 4,852,965 which issued on Aug. 1, 1989 is a hybrid cable which includes a reinforced optical fiber unit. The unit includes an optical fiber or fibers enclosed by at least three impregnated fiberglass members and a jacket. The unit is included along with metallic conductors in a core tube enclosed in a plastic jacket.

Also known are other hybrid cables in which optical fibers along with a twisted pair or pairs of metallic conductors are enclosed in a jacket. Such an arrangement may cause problems when the cable is routed in arcuate paths, such as might be expected in an office environment, because of the lack of control over the neutral axis of bending. Also, such an arrangement becomes somewhat difficult to terminate because of the randomness of the fiber and the metallic conductors in a core of the cable.

In hybrid cables, bending of the cable may aggravate buckling of cable components because of what seems to have been insufficient attention to the location of the neutral axis of bending with respect to vulnerable portions of a cable cross section which is transverse to a longitudinal axis of the cable. In bending, the neutral axis positions itself to cause the stresses across the cross section in tension to equal those in compression. The neutral axis will shift from the geometric center toward the more flexurally rigid side of the cross section to provide more area on the less flexural rigid side to balance the stresses. The result may mean that a significant portion of the cable cross section is stressed excessively. For an optical fiber cable or a hybrid cable which includes optical fibers this may mean that one or ones of the fibers undesirably may be excessively stressed. This also may occur in any composite cable, that is in any cable which is not homogeneous in materials throughout its cross section.

What is sought after and what does not appear to be available in the prior art is a composite cable which includes a hybrid cable, for example, for use in a workstation environment and one which may be routed in an arcuate path or paths without damaging the fiber or the metallic conductors. Further, the cable must be easily manufacturable and must be easily connectorized. The ability to automatically connectorize the cable would be a desired feature. Also, the sought after cable desirably is one in which the neutral axis is in a desired location with any optical fibers therein being subjected only to minimal stress.

SUMMARY OF THE INVENTION

The foregoing needs not met by the prior art have been provided by the composite cable of this invention. A composite communications cable comprises a core which includes at least one communication transmission medium. Each said transmission medium in said core is enclosed in a covering material. A sheath system encloses the core, the sheath system having a cross section transverse to the longitudinal axis. The cable is divided into two portions with the flexural rigidity of each portion in compression being equal to the flexural rigidity of the other portion in tension and the flexural rigidity of the one portion and of the other portion being predetermined in a manner to cause the neutral axis of bending to be disposed in a desired location so that the transmission medium experiences minimal stress.

A hybrid cable which may be used to interconnect computer equipment, for example, includes a core which comprises first and second planar arrays of transmission media. Outer portions of the first planar array comprise longitudinally extending-strength members between which are disposed optical fibers each having a protective coating and a buffer layer of a flame retardant plastic material. The material of the buffer layer of each optical fiber also encloses the outwardly disposed strength members with adjacent members of the first array being connected by a web of the buffering material.

The second array includes a plurality of longitudinally extending metallic conductors. Each of the metallic conductors is enclosed by an insulative cover which comprises a plastic material. Adjacent members of the second array also are interconnected by a web of the plastic material comprising the insulative cover.

Enclosing the first and the second arrays of transmission media is a plastic jacket. The jacket is comprised of a plastic material which is flame retardant. Also in a preferred embodiment, a transverse cross section of the jacket has an oval shaped configuration.

The materials and the positioning of the arrays of the cable of this invention are such as to minimize undesired stressing of the optical fibers or of the metallic conductors. This is accomplished by causing the neutral plane of bending to be disposed between the first and second planar arrays. Further, a predetermined relatively low modulus plastic jacket material is used to cause the cable to have a relatively high degree of flexibility.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
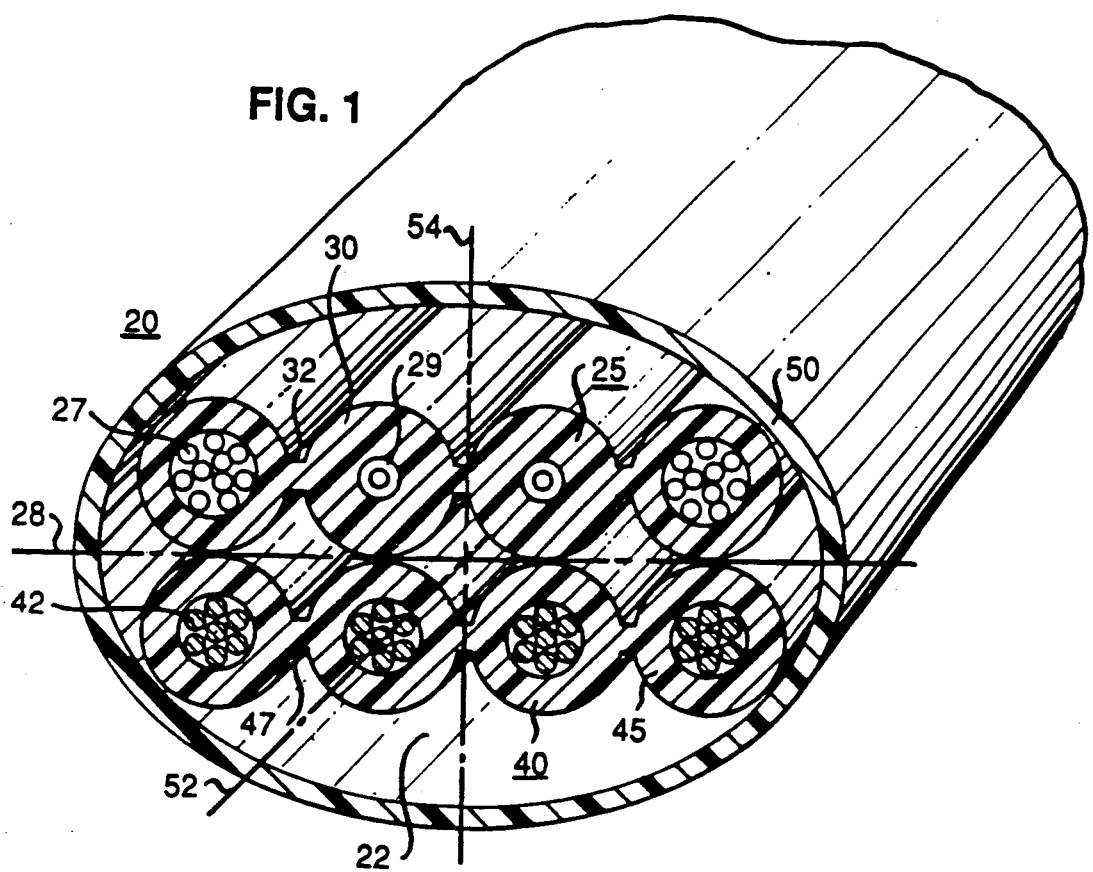
FIG. 1 is a perspective view of a cable of this invention.

Referring now to FIG. 1, there is shown a composite cable and, more particularly, a hybrid cable 20 of the invention. The cable 20 includes a core 22 which comprises an optical fiber portion and a metallic conductor portion.

The optical fiber portion comprises a first planar array 25. Disposed within the first array 25 are two longitudinally extending strength members 27—27 which form outer portions of the first array. Each of the strength members comprises a rod-like material such as a resin-impregnated Kevlar ® yarn. In the alternative, each strength member 27 may comprise a metallic material or a fiberglass rod. The strength members 27—27 are effective to provide the cable 20 with suitable tensile and compressive strength. It had been thought that a conventional unmodified Kevlar ® yarn could be used for the strength members. However, when such a cable was bent about an x axis of symmetry 28 to cause compression on the optical fiber first array side, those strength members buckled. It was determined that the strength members needed to have a higher flexural rigidity, which is the product of the material modulus and the moment of inertia, than was provided by unmodified Kevlar ® yarn. Kevlar ® yarns impregnated with a suitable material or fiberglass rods or metallic members were found to be suitable.

Also embedded in the array 25 and disposed between the strength members 27—27 are two optical fibers 29—29. Each of the optical fibers comprises drawn fiber having an outer diameter of about 125 microns, for example, and one or more protective coatings which bring the outer diameter to about 250 microns, for example.

The array 25 of optical fibers and strength members 27—27 is held together by material of a matrix 30 which encloses individually each of the longitudinally extending portions of the array. Each optical fiber and each strength member is enclosed in a circular portion of the matrix 30. In the prior art, individual coated optical fibers have been enclosed in a layer of buffering material for protective purposes. In the cable of this invention, buffering material is provided simultaneously for an array of optical fibers. In a preferred embodiment, the material of the matrix 30 comprises polyvinyl chloride (PVC). As can be seen in FIG. 1, adjacent enclosing portions of the matrix are interconnected by a web 32 of the same material. The web 32 is such that adjacent portions of the array 25 may be separated from other portions thereof by tearing or cutting along longitudinally extending web or webs.

The core 22 of the cable 20 also includes a second planar array 40. The second array 40 includes a plurality of longitudinally extending metallic conductors 42—42. In a preferred embodiment, each of the metallic conductors comprises 26 gauge tinned copper wires which are stranded together. It should be observed that the conductors which may comprise a pair are parallel and not twisted together.

As in the planar array 25, the array 40 includes a matrix 45 comprising a plastic material which encloses each of the metallic conductors 42—42. Preferably, the matrix 45 which encloses each portion of the second array has a partially circular configuration with adjacent portions of the second array being interconnected by a web 47 of the same material.

Enclosing the first and the second arrays is a jacket 50 having a uniform thickness. In a preferred embodiment, the jacket 50 comprises a polyvinyl chloride composition of matter. However, the polyvinyl chloride composition of the jacket 50 has a modulus of elasticity which is substantially less than that of the matrix 30 of the first array 25. Also, as can be seen in FIG. 1, the jacket 50 has a cross section transverse to a longitudinal axis 52 of the cable that is oval-shaped and that is symmetrical about both the x-axis 28 and about a y-axis of symmetry 54. The x-axis 28 of the oval-shaped cross section is termed a major axis and the y-axis 54 is referred to as a minor axis.

The cable of this invention is structured to cause the neutral axis of bending to be positioned so that the optical fiber experiences minimal stress. The neutral axis for which the location is predetermined is that axis which extends in the direction of the x-axis 28.

The cable 20 of this invention is arranged geometrically and materially so as to control the location of a neutral axis in the neutral plane of bending to be disposed between the first and the second arrays along the x-axis. Of course, the materials which enclose the optical fibers, the strength members and the metallic conductors are important contributors to the location of the neutral axis.

In order to accomplish the desired positioning, the overall flexural rigidity of one array needs to be about equal to that of the other array. Inasmuch as the jacket has a relatively low modulus and flexural rigidity and a cross section which is symmetrical with respect to the x axis, the jacket of the cable 20 does not affect the positioning of the neutral axis. The problem of positioning arises because of the different materials embodied in the optical fiber and the strength members of the first array 25 compared to the material of the metallic conductors in the second array 40. Without any compensation in the second array, the neutral axis would be disposed between the x-axis of symmetry and the geometrical center of the first array. This would occur because the modulus of the strength members is substantially greater than that of the copper conductors, the copper being relatively soft.

For the cable 20, the offset for the higher contribution of moduli of the strength members is provided by the matrix 45 of the second array. It will be recalled that in the array 25, each of the strength members as well as each optical fiber is enclosed with a polyvinyl chloride composition of matter. The flexural rigidity of the matrix 45 of the second array is increased over that of the first array by causing each of the metallic conductors in the second array to be enclosed with a plastic material such as, for example, a composition of matter which has a modulus that is substantially higher than that of the buffering material which encloses the optical fiber. In a preferred embodiment, the matrix 45 of the second array comprises a polyether polyester composition of matter. A commercially available polyether polyester composition of matter is one marketed under the designation HYTREL® plastic material by the E. I. DuPont de Nemours Company of Wilmington, Del. Because the modulus of the insulation or matrix material 45 on the metallic conductors substantially increased, the flexural rigidity of the second array closely matches that of the first array 25 and the neutral axis is shifted to the desired position between the two arrays. As a result, undue strains and accompanying transmission losses in the transmission media are avoided.

Advantageously, the cable 20 of this invention is suitable for automation in connectorization. Inasmuch as the optical fibers and the copper conductors are arranged in linear arrays, identification is a relatively easy matter. Information regarding the identification may be provided to a robotic system (not shown) which is capable of connectorizing the optical fibers with an ST® connector, for example, or desired one or ones of the copper conductors with any suitable commercially available connector.

Furthermore, breakout from the arrays is a relatively easy matter for a craftsperson. Because the strength members 27—27 are located in one of the arrays instead of in the jacket 50, the jacket may be removed from a portion of the cable to expose one or both arrays of the transmission media. Also, it becomes relatively easy to separate one or more optical fibers or copper conductors from respective arrays because of the webbed arrangement of the arrays. A craftsperson may cut along a web 32 or 47 to separate a fiber or copper conductor, respectively, without risking damage to the fibers or to the copper conductors.

Another advantage of the cable 20 of this invention relates to its manufacture. Because the transmission media of each array extend generally parallel to a longitudinal axis of the array, no stranding is required. This is advantageous and allows higher manufacturing line speeds because of the absence of rotating equipment which otherwise would be required to impart a lay to the media. What is provided by this invention are cables which can be manufactured in one process on a manufacturing line, which are relatively compact and which are hybrid in nature in that they include optical as well as metallic transmission media.

The outer dimension of each optical fiber 29 together with its associated enclosing buffering material is somewhat less than that of prior art buffered fibers. This is done because when a craftsperson separates an optical fiber from its array by cutting along the webs 32—32 adjacent thereto, a portion of each web, referred to as flashing, remains attached to the buffered fiber. In order to allow the buffered fiber with the flashing to be connectorized with conventional size connectors, the overall outer dimension must be reduced so that the buffered fiber together with any flashing is capable of being received in cavities or bores having conventional size dimensions.

Also, the cross sectional configuration of the cable which is transverse to the longitudinal axis 52 thereof is important. Generally it is oval-shaped and is sized so that end portions of each array proximately engage an inner wall of the jacket 50. What is important is that although some slight movement of the arrays may occur within the core, the relative positions of the two arrays with respect to each other and with respect to the jacket will remain substantially constant during use.

Further, the plastic material of the jacket 50 has a modulus which is substantially less than that of the plastic material which buffers the optical fiber 29 and the strength members 27—27 and of that which encloses the metallic conductors 42—42. For example, in a preferred embodiment, the modulus of the plastic material which encloses the metallic conductors 42—42 is about 30,000 psi, the modulus of the plastic material which buffers the optical fiber 29 is about 2000 psi and the modulus of the plastic material of the jacket 50 is in the range of about 800 to 1000 psi. In this way, the jacket 50 is relatively limp and the cable 20 has very desirable flexibility.

Figure 2:
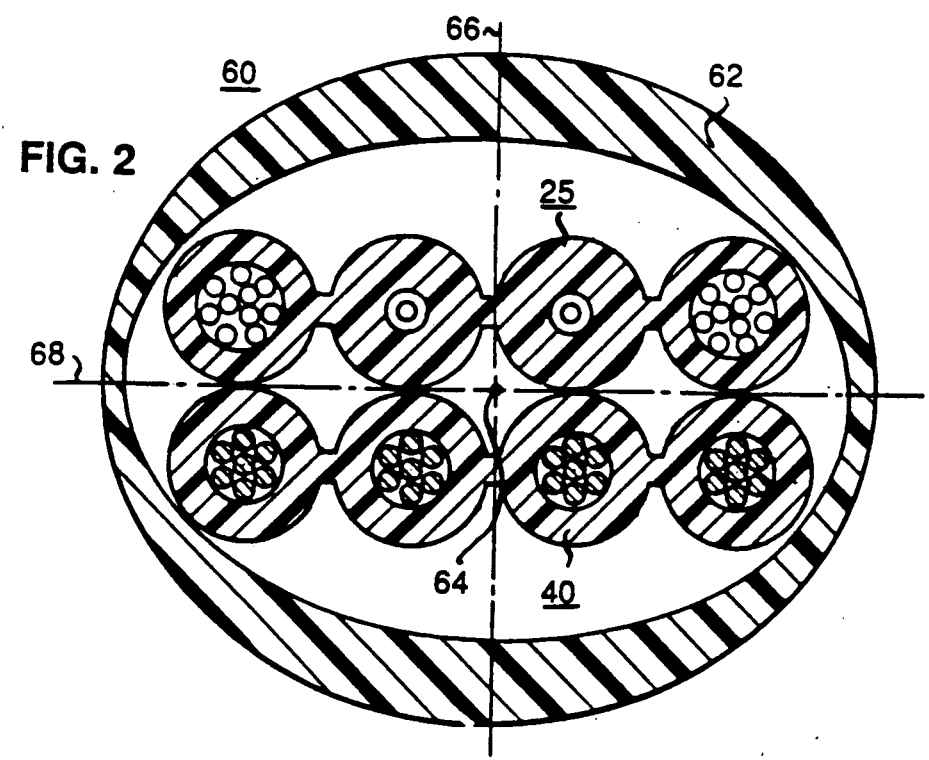
FIG. 2 is a perspective view of a preferred embodiment of the cable of this invention.

A preferred embodiment of this invention is a cable 60 depicted in FIG. 2 and includes a jacket 62 having a cross section transverse of longitudinal axis 64 which has a non-uniform thickness. The configuration of the jacket wall, which approaches a circular configuration along a minor axis 66 of the cross section, is included in order to prevent the appearance of unsightly twisting in the cable 60 when the cable is routed in a relatively small radius, arcuate path. The closer the cable cross section approximates a circular configuration, the less observable will be any twisting of the cable when it is routed in sharp bends as may be expected in an office workstation environment. Although the cable cross section of the preferred embodiment approaches that of a circle, the outer dimension of the cable along the minor axis 66 axis is still less than that along a major axis 68 of the cross section. For example, in the preferred embodiment, the outer dimensions along the two major axes, the minor and the major, are 0.44 cm and 0.53 cm, respectively.

It is to be understood that the above-described arrangements are simply illustrative of the invention. Other arrangements may be devised by those skilled in the art which will embody the principles of the invention and fall within the spirit and scope thereof.

We claim:

1. A composite communications cable, which comprises:
 a core which includes at least one communication transmission medium, each said transmission medium in said core being enclosed in an enclosing covering material; and
 a sheath system which encloses said core and which has a longitudinal axis, said sheath system having a cross section transverse to the longitudinal axis;
 wherein said cross section of the core is divided into two portions with the flexural rigidity of each portion in compression being equal to the flexural rigidity of the other portion in tension and the flexural rigidity of the one portion and of the other portion being predetermined in a manner to cause the neutral axis of bending in said cross section to be disposed in a desired location so that each said transmission medium experiences minimal stress.

2. The cable of claim 1, wherein said sheath system is characterized by at least one axis of symmetry.

3. The cable of claim 1, wherein said sheath system is characterized by orthogonal axes of symmetry and wherein said neutral axis of bending extends parallel to one of said orthogonal axes of symmetry.

4. A hybrid optical fiber, metallic conductor cable, said hybrid cable comprising:
   a core which comprises:
      a first planar array which comprises longitudinally extending portions with outer portions of the array comprising strength members and inner portions of the array disposed between said strength members being optical fibers; and
      a second array which comprises longitudinally extending metallic conductors; and
   a jacket which encloses said first and second arrays, said jacket being made of a plastic material;
   said cable having a neutral axis of bending which is disposed in a desired location.

5. The cable of claim 4, wherein each array comprises longitudinally extending parallel portions.

6. The cable of claim 4, wherein each of said arrays includes a matrix material which encloses each of said longitudinally extending portions, said optical fibers of said first array each including one or more protective coating layers and a layer of said matrix material.

7. The cable of claim 6, wherein each two adjacent portions of each array are interconnected by a web of the matrix material of said each array.

8. The cable of claim 6, wherein said first and second arrays are parallel.

9. The cable of claim 6, wherein the neutral axis of bending of said cable is parallel to each of said arrays.

10. The cable of claim 9, wherein the neutral axis of bending which is parallel to each of said arrays is disposed between said first and said second arrays.

11. The cable of claim 10, wherein each of said optical fibers in said first array is enclosed with a plastic material being characterized by a first modulus and wherein each of said metallic conductors is enclosed with a plastic material characterized by a second modulus which is substantially higher in value than that of said first modulus.

12. The cable of claim 11, wherein the plastic material which encloses each said optical fiber is a polyvinyl chloride composition of matter and the plastic material which encloses each said metallic conductor comprises a polyether polyester composition of matter.

13. The cable of claim 12 wherein the modulus of each of said strength members is substantially greater than that of each of said metallic conductors.

14. The cable of claim 13, wherein the modulus of the plastic material of said jacket is substantially less than that of the matrix material which encloses said optical fibers.

15. The cable of claim 14, wherein the plastic material of said jacket and of said matrix material which encloses said optical fibers is a polyvinyl chloride.

16. The cable of claim 15, wherein one of orthogonal axes of symmetry of a cross section of said cable which is transverse to a longitudinal axis of said cable is parallel to each of the first and the second arrays.

17. The cable of claim 4, wherein each of said strength members comprises fibrous yarn.

18. The cable of claim 17, wherein each said strength member comprises a fibrous yarn which has been impregnated with a resinous material.

19. The cable of claim 4, wherein the jacket has a cross section transverse of a longitudinal axis which is symmetrical with respect to each of orthogonal axes of said cross section.

20. The cable of claim 19, wherein the transverse cross section of said jacket has an oval-shaped configuration.

21. The cable of claim 20, wherein the transverse cross section of said jacket has major and minor axes with the thickness of the jacket along the minor axis being substantially greater than that along the major axis.

* * * * *